US012684312B2

(12) United States Patent　　(10) Patent No.:　US 12,684,312 B2
Suzuki et al.　　　　　　　　　　　(45) Date of Patent:　　Jul. 14, 2026

(54) INFORMATION PROCESSING APPARATUS AND PROGRAM

(71) Applicant: SmartNews, Inc., Tokyo (JP)

(72) Inventors: Ken Suzuki, Tokyo (JP); Koichi Yamamoto, Tokyo (JP)

(73) Assignee: SmartNews, Inc., Tokyo (JP)

( * ) Notice: Subject to any disclaimer, the term of this patent is extended or adjusted under 35 U.S.C. 154(b) by 434 days.

(21) Appl. No.: 18/447,742

(22) Filed: Aug. 10, 2023

(65) Prior Publication Data

US 2023/0396963 A1　　Dec. 7, 2023

Related U.S. Application Data

(63) Continuation of application No. 17/327,962, filed on May 24, 2021, now Pat. No. 11,770,684.

(30) Foreign Application Priority Data

Jun. 8, 2020　　(JP) ................................. 2020-099250

(51) Int. Cl.
　　*H04W 4/029*　　　(2018.01)
　　*G01W 1/10*　　　　(2006.01)
　　　　　　(Continued)
(52) U.S. Cl.
　　CPC .............. *H04W 4/029* (2018.02); *G01W 1/10* (2013.01); *G09B 29/007* (2013.01); *H04W 4/023* (2013.01); *G01W 2203/00* (2013.01)
(58) Field of Classification Search
　　CPC ....... H04W 4/029; H04W 4/023; G01W 1/10; G09B 29/007
　　See application file for complete search history.

(56) References Cited

U.S. PATENT DOCUMENTS 11,770,684 B2 *　9/2023　Suzuki .................... G01W 1/10
　　　　　　　　　　　　　　　　　　　　　　455/456.3
2010/0238179 A1　9/2010　Kelly
　　　　　　　　　(Continued)

FOREIGN PATENT DOCUMENTS

JP　　　　　11-2539　A　　1/1999
JP　　　2008-116364　A　　5/2008
　　　　　　　(Continued)

OTHER PUBLICATIONS

Satoshi Hinuma, "Catch information before it rains! Measures against rainy season and guerrilla rainstorm with [Rain Alert PRO]", Keitai Watch, Jul. 3, 2015, pp. 2-5 (12 pages total).
　　　　　　　(Continued)

*Primary Examiner* — Curtis B Odom
(74) *Attorney, Agent, or Firm* — Sughrue Mion, PLLC

(57)　　　　　　ABSTRACT

An information processing apparatus includes a message display module which, when a predetermined event is predicted to occur at a set location of interest, displays a message indicating occurrence of the predetermined event and the time until the occurrence of the predetermined event. The location of interest may be set to a current position of the information processing apparatus. The information processing apparatus may also include a map display module that displays a map including the location of interest, wherein the message displaying module displays the message in such a manner as to be superimposed on the map.

10 Claims, 13 Drawing Sheets

(51) Int. Cl.
    *G09B 29/00*      (2006.01)
    *H04W 4/02*      (2018.01)

(56)             References Cited

U.S. PATENT DOCUMENTS

| | | |
|---|---|---|
| 2011/0166777 A1 | 7/2011 | Chavakula |
| 2018/0321713 A1 | 11/2018 | Okabe et al. |

FOREIGN PATENT DOCUMENTS

| | | |
|---|---|---|
| JP | 2011-040012 A | 2/2011 |
| JP | 2017-135474 A | 8/2017 |
| JP | 2019-121276 A | 7/2019 |

OTHER PUBLICATIONS

Hiroki Odagiri, "Yahoo! improves the rain cloud radar of the application. Check the start of falling, the amount of rainfall, and the intensity of rain at a glance", Travel Watch, May 11, 2021, pp. 1-6 (13 pages total).

Office Action issued Apr. 1, 2025 in Japanese Application No. 2021-180497.

Japanese Office Action dated Sep. 2, 2025, issued in Japanese application No. 2021-180497.

\* cited by examiner

621A

621B

602A

602B

602C

602D

602E

640

642

IN 54 MIN. 26 SEC.
TOKYO OLYMPIC
MEN'S 100 M FINAL

641

644

IN 42 MIN. 53 SEC.
DURING LIMITED-TIME
SALE!
YAKITORI

643

620

INFORMATION PROCESSING APPARATUS AND PROGRAM

CROSS-REFERENCE TO RELATED APPLICATIONS

This application is a Continuation application of U.S. application Ser. No. 17/327,962 filed on May 24, 2021, claiming priority to Japanese Patent Application No. 2020-099250, filed Jun. 8, 2020, the disclosures of each of which being incorporated by reference herein in their entireties.

BACKGROUND

Field of the Invention

The present invention relates to notifying a user of a message.

Background Art

A weather forecast is displayed on a screen of a mobile terminal or the like.

JP-H11-2539A discloses that a map for a current location is displayed on a screen of a navigation system that is mounted to a vehicle, with rain clouds superimposed on the map to enable a user to check the weather at a current location and at a destination.

SUMMARY

The present invention provides an information processing apparatus and a program that enables a user to easily recognize an event that is predicted to occur at a present user location or at another location specified by the user.

In one aspect of the present invention, there is provided an information processing apparatus that includes a message display module which, when a predetermined event is predicted to occur at a set location of interest, displays a message indicating occurrence of the predetermined event and a length of time until the occurrence of the predetermined event.

DESCRIPTION OF REFERENCE SIGNS

1 . . . mobile terminal, 2 . . . network, 3 . . . distribution server, 4 . . . map information server, 5 . . . weather information server, 11 . . . position information acquisition unit, 12 . . . map acquisition unit, 13 . . . weather information acquisition unit, 14 . . . display control unit, 15 . . . operation detection unit, 102 . . . memory, 103 . . . interface, 104 . . . communication unit, 105 . . . output unit, 106 . . . input unit, 107 . . . positioning system, 141 . . . map display module, 142 . . . message display module, 143 . . . image display module, 301 . . . processor, 302 . . . memory, 303 . . . interface, 304 . . . communication unit, S . . . information processing system.

EXEMPLIFIED EMBODIMENTS

Embodiment

Figure 1:
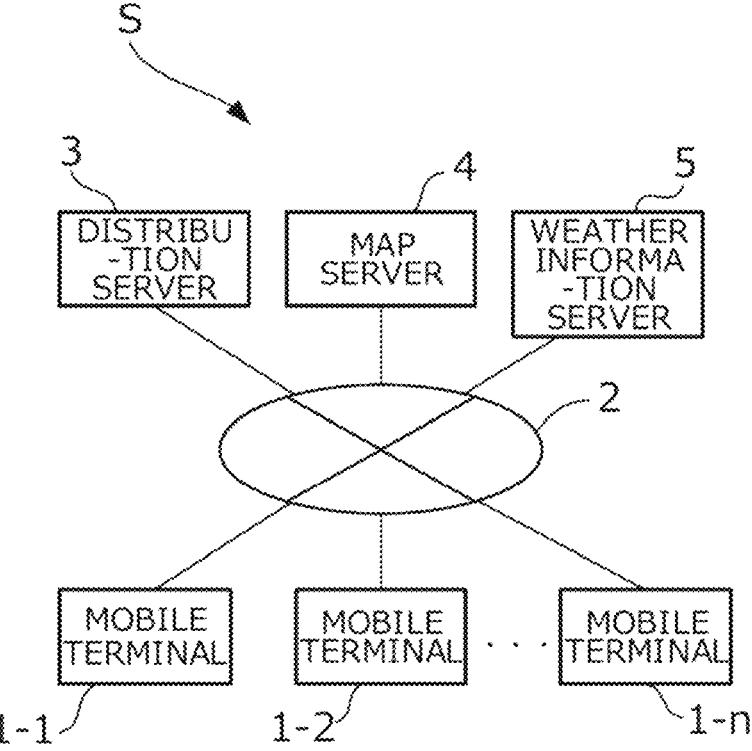
FIG. 1 is a diagram illustrating a configuration of an information processing system including mobile terminals, each of which corresponds to an information processing apparatus according to one embodiment.

An information processing apparatus according to one embodiment of the present invention will now be described below. FIG. 1 is a diagram illustrating a configuration of an information processing system S that includes a plurality of mobile terminals 1-1, 1-2, . . . , 1-n, each of which corresponds to the information processing apparatus according to the embodiment.

The information processing system S consists of the plurality of mobile terminals 1-1, 1-2, . . . , 1-n (hereinafter collectively referred to as "mobile terminals 1"), a distribution server 3, a map information server 4, and a weather information server 5, which are connected to each other through a network 2.

The network 2 is a network such as the Internet that enables each of the plurality of mobile terminals 1 to be wirelessly connected to the network 2 through which the mobile terminal 1 can communicate with the distribution server 3 connected to the network 2.

The mobile terminal 1 is a mobile information terminal having a wireless communication function, such as a smartphone, which can be carried by a user. The mobile terminal 1 communicates with the distribution server 3 such that information transmitted from the distribution server 3 can be displayed on a display screen of the mobile terminal 1.

The distribution server 3 is a server capable of distributing information such as news and a weather forecast to the mobile terminal 1. The map information server 4 is a server that transmits, to the distribution server 3, map information for a designated area upon request by the distribution server 3. The weather information server 5 is a server that transmits, to the distribution server 3, weather information for the weather forecast upon request by the distribution server 3.

Figure 2:
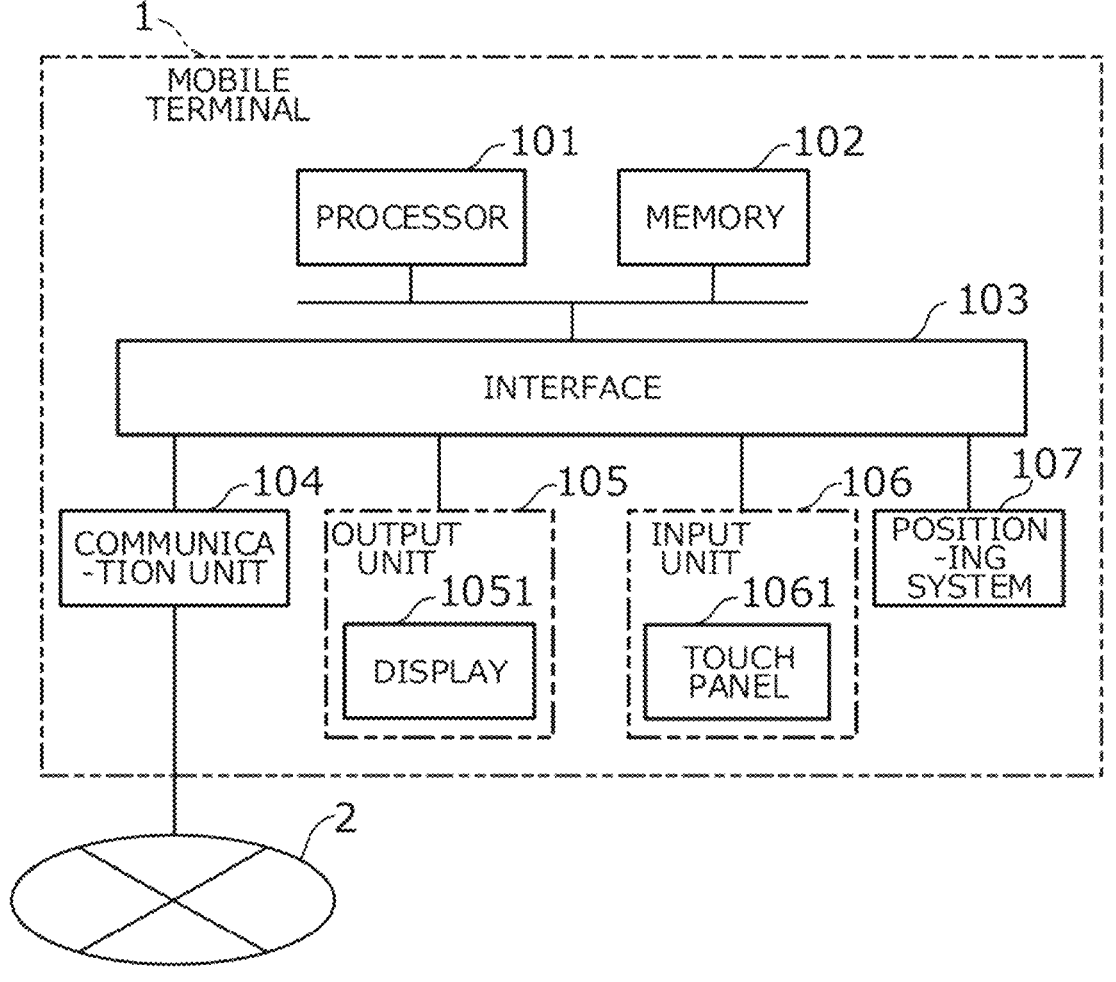
FIG. 2 is a block diagram illustrating the hardware configuration of the mobile terminal according to the embodiment.

FIG. 2 is a block diagram illustrating the hardware configuration of the mobile terminal 1. The mobile terminal 1 is a computer having a processor 101, a memory 102, an interface 103, a communication unit 104, an output unit 105, an input unit 106, and a positioning system 107. These components are connected to each other, for example, through a bus such that they are able to communicate with each other.

The processor 101 reads out and executes a computer program (hereinafter simply referred to as "program") stored in the memory 102 to control each unit of the mobile terminal 1. The processor 101 is, for example, a CPU (Central Processing Unit).

The memory 102 is a storage unit for storing an operating system, various programs, data and the like to be read into the processor 101. The memory 102 may comprise a RAM (Random Access Memory) and a ROM (Read Only Memory). It is of note that the memory 102 may also comprise a solid-state drive, a hard disk drive, or the like.

The interface 103 is a communication circuit that connects the processor 101 to the communication unit 104, the output unit 105, the input unit 106, and the positioning system 107.

The communication unit 104 controls communication with the distribution server 3 through the network 2.

The output unit 105 includes a display unit to display images and text, and an audio output unit such as a speaker to output sound. In the present embodiment the output unit 105 includes a display 1051, which is a flat panel display such as a liquid crystal display or an organic EL display for display of images and text.

The input unit 106 is an operation unit includes a keyboard, a mouse, and the like for input of information in accordance with a user's instruction operations. In the present embodiment, the input unit 106 is a touch panel 1061, which includes in combination with the display 1051 a position input device such as a touch pad that enables a user to operate the apparatus by touching a display part on the screen.

The positioning system 107 is, for example, a satellite positioning system such as GPS (Global Positioning System), which is a system for measuring a current geographic position.

In the present embodiment, a smartphone is used as the mobile terminal 1, but a portable PC (personal computer), a tablet PC, or the like may also be used.

Figure 3:
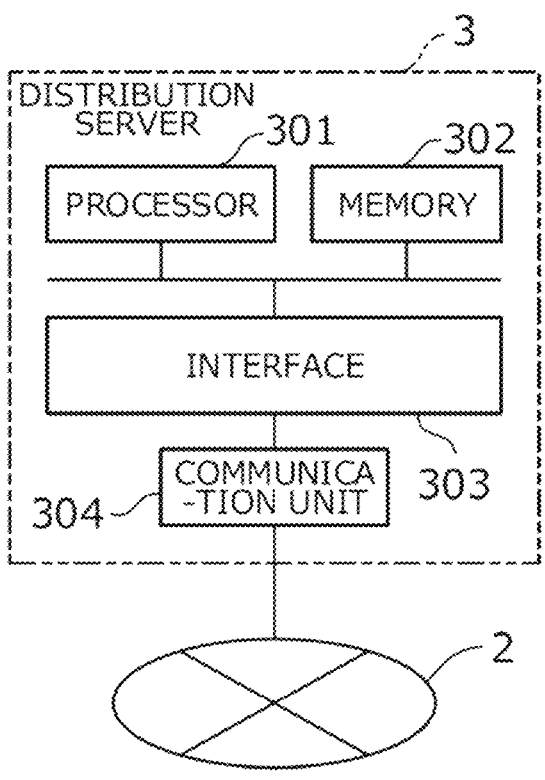
FIG. 3 is a block diagram illustrating the hardware configuration of a distribution server according to the embodiment.

FIG. 3 is a block diagram illustrating the hardware configuration of the distribution server 3. The distribution server 3 is a computer having a processor 301, a memory 302, an interface 303, and a communication unit 304. These components are connected to each other, for example, through a bus such that they are able to communicate with each other.

The processor 301 reads out and executes a computer program (hereinafter referred to as the "program") stored in the memory 302 to control each unit of the distribution server 3. The processor 301 is, for example, a CPU (Central Processing Unit).

The memory 302 is a storage unit for storing an operating system, programs, data, and the like to be read into the processor 301. The memory 302 has a RAM (Random Access Memory) and a ROM (Read Only Memory). It is of note that the memory 302 may also have a solid-state drive, a hard disk drive, or the like.

The interface 303 is a communication circuit for connection of the processor 301 with the communication unit 304.

The communication unit 304 controls communication carried out with the mobile terminal 1, the map information server 4, and the weather information server 5 through the network 2.

Since the configurations of the map information server 4 and the weather information server 5 are the same as the configuration of the distribution server 3, overlapping descriptions are omitted.

Figure 4:
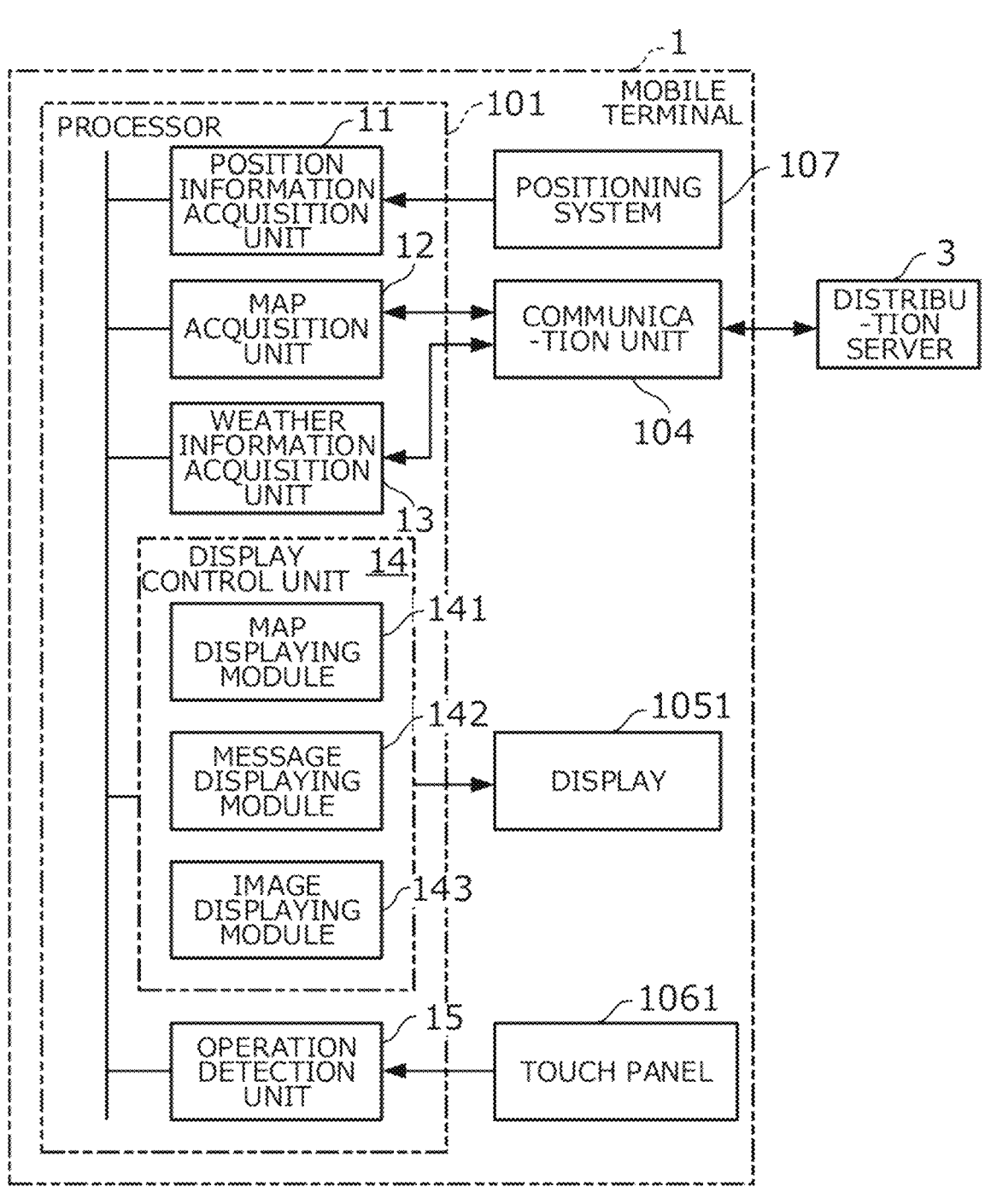
FIG. 4 is a block diagram illustrating the functional configuration of the mobile terminal according to the embodiment.

FIG. 4 is a diagram illustrating the functional configuration of the mobile terminal 1. Execution of the program stored in the memory 302 by the processor 101 of the mobile terminal 1 causes each of a position information acquisition unit 11, a map acquisition unit 12, a weather information acquisition unit 13, a display control unit 14, and an operation detection unit 15 to function. The display control unit 14 includes a map display module 141, a message display module 142, and an image display module 143.

The position information acquisition unit 11 acquires information on a current position from the positioning system 107. In other words, the position information acquisition unit 11 acquires current geographic position information of the mobile terminal 1.

The map acquisition unit 12 transmits the current position information acquired by the position information acquisition unit 11 to the distribution server 3 through the communication unit 104 to acquire from the distribution server 3, map information for the current position. The distribution server 3 communicates with the map information server 4 to acquire and store accumulated map information in the memory 302. When map information on a position requested from the map acquisition unit 12 of the mobile terminal 1 has already been stored in the memory 302, the map information is transmitted. On the other hand, when the map information on the requested position has not been stored in the memory 302, the distribution server 3 acquires the map information from the map information server 4, stores the map information in the memory 302, and transmits the map information to the mobile terminal 1.

The weather information acquisition unit 13 transmits the current position information acquired by the position information acquisition unit 11 to the distribution server 3 through the communication unit 104, and acquires, from the distribution server 3, weather information for the current position for a period from a predetermined past time before the current time to a predetermined future time after the current time. The weather information is, for example, image data representative of weather in each of areas obtained by subdividing a predetermined range for the current position into tiles. The image data can be converted to weather data representative of details of weather at each of position coordinates. Further, as weather information to be acquired, weather data consisting of details of weather at respective position coordinates for the current position, rather than tiled image data, may be acquired. Specifically, the weather data is data representative of a level of rainfall or snowfall at position coordinates. The weather data are acquired for each of an area as past data, current data, and future forecast data.

It is of note that weather targeted for weather information is not limited to rain or snow; and wind, temperature, humidity, ultraviolet light, and the like may also be targeted. Moreover, the weather information may also be information indicative of a warning, an advisory, or any other warning level based on such targets (including a warning level of a phenomenon that occurs in a human body, such as heatstroke or infectious disease that may occur as a result of to a weather condition, in addition to the warning level of the weather itself).

The distribution server 3 communicates with the weather information server 5 to acquire weather information, and accumulates and stores in the memory 32 each of past, current, and future weather information. When the weather information for the position requested by the weather information acquisition unit 13 of the mobile terminal 1 has already been accumulated and stored in the memory 302, the weather information is transmitted. On the other hand, when the weather information for the requested position has not been accumulated and stored in the memory 302 (including a case where there is a missing period in the weather information for the predetermined period from the past to the future), the distribution server 3 acquires these pieces of weather information from the weather information server 5, accumulates and stores the weather information in the memory 302, and transmits the weather information to the mobile terminal 1.

Based on information acquired by each of the position information acquisition unit 11, the map acquisition unit 12, and the weather information acquisition unit 13, the display control unit 14 controls display of images or text on the display 1051.

The map display module 141 controls display of a map image on the display 1051 based on the map information for the current position acquired by the map acquisition unit 12. Further, the map display module 141 controls display of weather condition for the current position acquired by the weather information acquisition unit 13, and displays the imaged weather conditions in such a manner as to be superimposed on the map image on the display 1051.

When it is forecast that a predetermined weather change will occur (in other words, expected to or predicted to occur) at a set location of interest, the message display module 142 performs control of generation of information indicating the occurrence in the change in the weather and generation of a message indicative of a time remaining until the occurrence of the change in the weather, and displays a pop-up including the message in such a manner as to be superimposed on the map image on the display 1051. The location of interest is a central position of the map image displayed on the display 1051, the current position of the mobile terminal 1, a point designated by the user, or the like.

The message display module 142 analyzes weather information at the current position or the point designated by the user to predict whether the weather change will occur within a predetermined date and at a predetermined time and generates the message to be displayed in the pop-up. Notifications of weather changes may be, for example, start of rain, start of snow, stop of snow, or the like.

The image display module 143 displays an image indicative of a change in weather over time at the current position or the point designated by the user such that the map image and the weather information image are displayed on the display 1051 by the map displaying module 141. Specifically, a bar graph indicative of an amount of rainfall or snowfall is displayed in each time slot by plotting a time on the abscissa and an amount of rainfall or snowfall on the ordinate. The period of time on the abscissa includes a predetermined period of time from the past to the present, and a predetermined period of time from the present to the future.

The operation detection unit 15 detects when an operation is performed using the touch panel 1061. Specifically, the operation detection unit 15 detects that a user's finger has touched a position on the display screen of the display 1051, and a user operation involving slide of the user's finger has been further performed in the touch state. When such an operation is performed, the operation detection unit 15 detects the slide start position, and the slide direction and distance.

Based on the detection results obtained by the operation detection unit 15, the display control unit 14 performs control of a change of the display. For example, based on a detection position obtained by the operation detection unit 15 of a slide operation in a map image, the map display module 141 performs control of a slide of the display of the map image.

Figure 5:
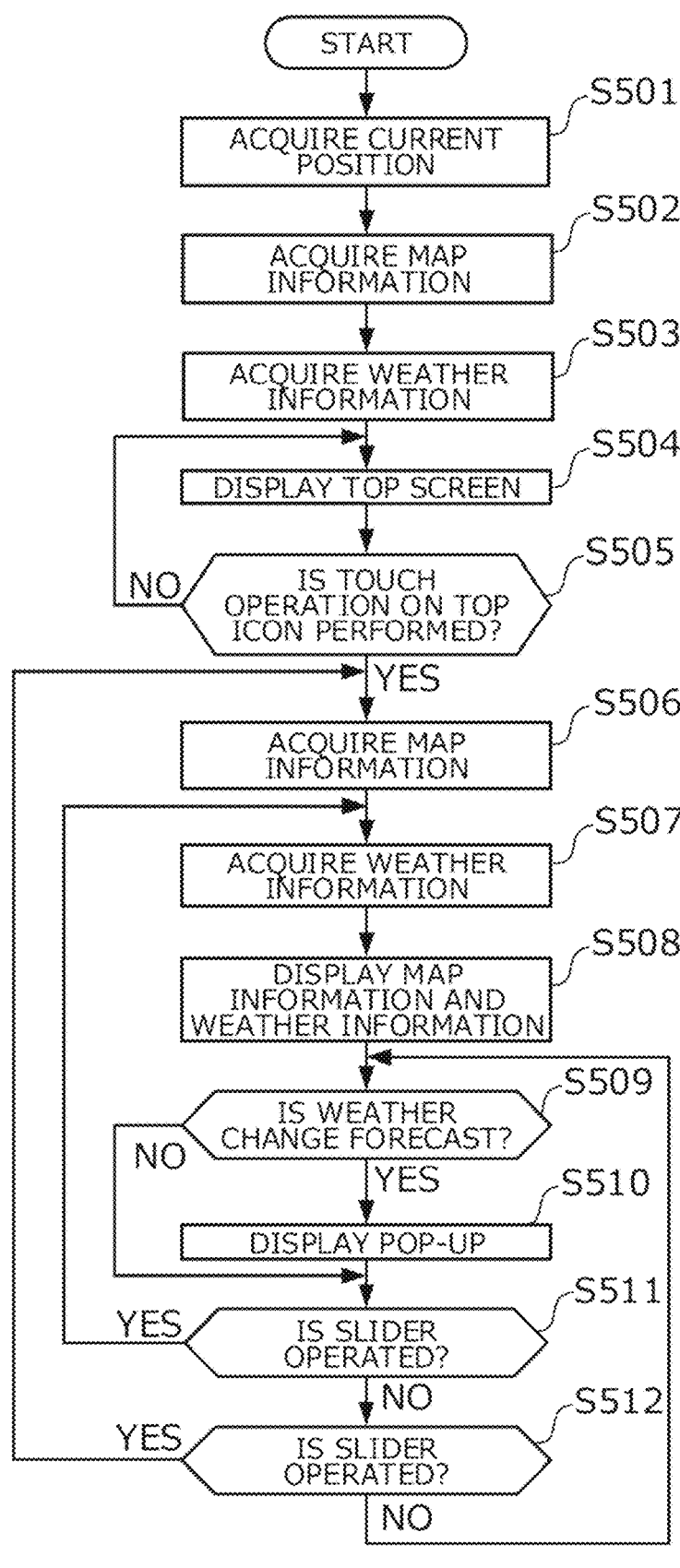
FIG. 5 is a chart illustrating a flow of processing on the mobile terminal according to the embodiment.

FIG. 5 is a chart illustrating a flow of processing on the mobile terminal 1. The processing described below is performed by the processor 101 of the mobile terminal 1 upon execution of a program stored in the memory 102. The program is an application program (hereinafter simply referred to in abbreviated form as an "app") created by a service provider.

The app can be downloaded to the mobile terminal 1 from a server that is connected to the network 2, and to which various apps are uploaded, and stored in the memory 102. The processing below is executed by launching the app responsive to a user's operation.

When the app is launched, the position information acquisition unit 11 first acquires current position information from the positioning system 107 (step S501). The map acquisition unit 12 then acquires map information corresponding to the current position (step S502), and the weather information acquisition unit 13 acquires today's weather forecast information corresponding to the current position (step S503), and then the display control unit 14 displays a top screen on the display 1051 (step S504).

Figure 6:
FIG. 6 is a diagram illustrating a top screen when an app is running on the mobile terminal according to the embodiment.

FIG. 6 is a diagram illustrating a top screen 600 displayed on the display 1051 immediately after the app is launched on the mobile terminal 1. Weather information is displayed in addition to headlines of plural different news articles.

In a weather information display field 601, the name of a current location (the name of a city or the like) based on the current position information, a weather mark indicative of the weather forecast for the current position, and the highest temperature and lowest temperature for the day are displayed. Display of these items is realized by the display control unit 14 based on information acquired by the position information acquisition unit 11, the map acquisition unit 12, and the weather information acquisition unit 13, and current time information.

A top icon 602 is displayed adjacent to the weather information display field 601. A display of "Rain Radar" is provided in the top icon 602. The rain radar is a service that is provided to facilitate ease of viewing of when and where rain (or snow) falls.

In the present embodiment, the rain radar service is realized by displaying an image in which weather information is superimposed on a map image near the current position. As will be described below, control of switching the display to a screen for the rain radar is performed by the user touching the top icon 602.

Returning to FIG. 5, the operation detection unit 15 detects whether the user has performed an operation to touch the position of the top icon 602 displayed on the display 1051 (step S505). If the operation is not detected (step S505:

No), the display control unit 14 continues display processing of the top screen 600 in step S504.

If the operation detection unit 15 detects the operation to touch the position of the top icon 602 (step S505: Yes), the display control unit 14 performs processing to switch the screen display.

First, the map display module 141 of the display control unit 14 acquires map information near the current position (step S506). Then, the map display module 141 acquires weather information near the current position (step S507). Then, the map displaying module 141 performs control to generate and display a map image on the display 1051 based on the acquired map information and weather information. Further, the map displaying module 141 performs control to generate a weather image indicative of current weather based on the acquired weather information, and displays the weather image in such a manner as to be superimposed on the map image on the display 1051.

Figure 7:
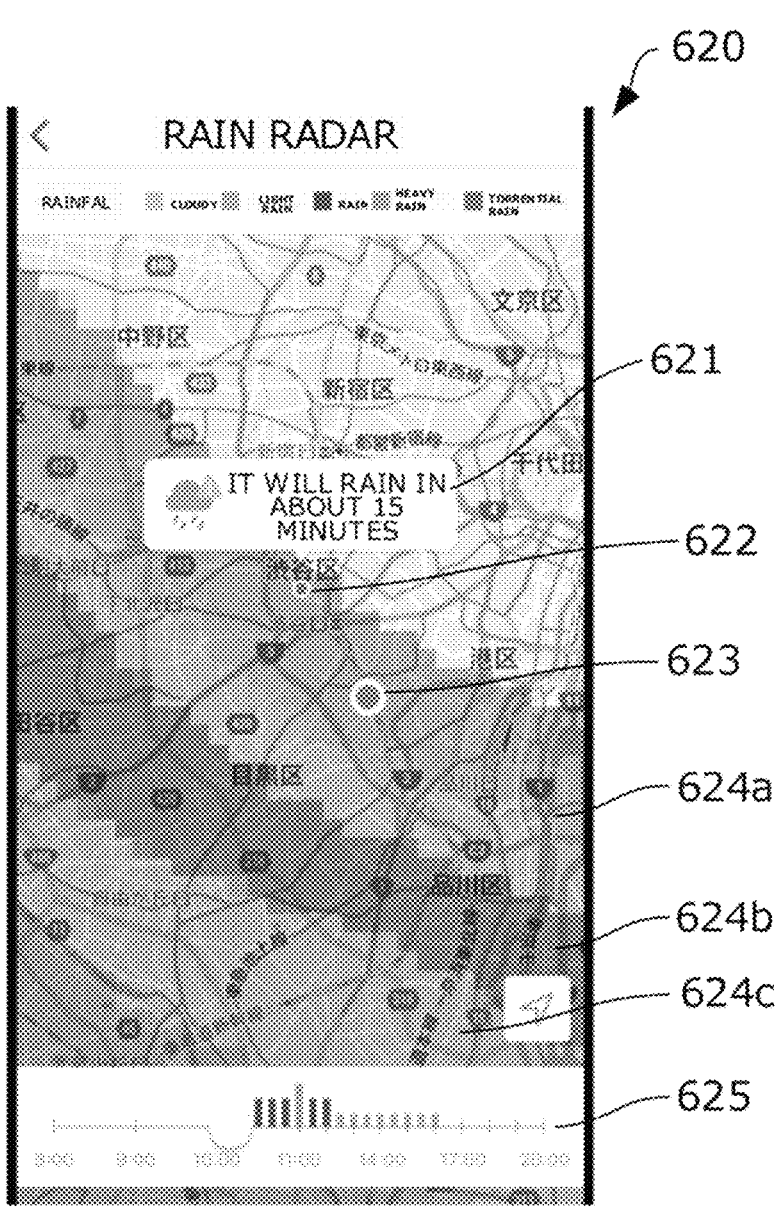
FIG. 7 is a diagram illustrating a display screen of weather conditions on the mobile terminal according to the embodiment.

FIG. 7 is a diagram illustrating a map image and a weather image to be displayed on the display 1051 of the mobile terminal 1. In a map display screen 620 displayed, a pop-up 621, a central position mark 622, a current position mark 623, rainfall areas 624a, 624b, 624c, and a time change slider 625 are displayed.

The central position mark 622 indicates the central position of the displayed map. The current position mark 623 indicates the current position of the mobile terminal 1 on the displayed map. In an initial state where the top icon 602 is touched by the user and the map display screen 620 is displayed, the central position mark 622 and the current position mark 623 match each other. In other words, the map is displayed such that the central position of the map becomes the current position in the initial state.

The display position of the current position mark 623 on the screen can be changed by the user touching any position of the map image and performing a slide operation. The map image is moved in accordance with the direction and distance of the slide operation by the user touching any position on the map image and performing the slide operation. The display position of the current position mark 623 is moved along with the movement of the map image. The central position mark 622 is always displayed in the central position of the displayed map even when the slide operation is performed.

The rainfall areas 624a, 624b, 624c are images indicative of rainfall (or snowfall) conditions that are displayed in such a manner as to be superimposed on the map image. The area indicated by each of the rainfall areas 624a, 624b, 624c on the map is an area in which rain clouds are present, that is, an area in which it is raining (or snowing) or it will soon rain (or snow). Specifically, the rainfall area 624a is an area in which it is cloudy but not raining (or snowing), the rainfall area 624b is an area in which it is raining (or snowing) lightly, and the rainfall area 624c is an area in which it is raining (or snowing) (stronger than in the rainfall area 624b). These three areas are displayed in different colors. In addition to these three areas, areas of "heavy Rain (or Snow)" and "Torrential Rain (or Snow)" may also be displayed in different colors.

The pop-up 621 and the time change slider 625 will be described later.

Returning to FIG. 5, the message display module 142 determines whether a weather change is forecast within a predetermined time from the present in a state where the map display screen 620 is displayed (step S509). Based on future weather forecast information in the weather information acquired by the weather information acquisition unit 13, the message displaying module 142 determines whether a weather change occurs within the predetermined time (for example, within 10 hours from the present) at the point of the central position mark 622 displayed on the screen.

When it is not presently raining (snowing), the weather change is when it starts to rain (or snow), while when it is presently raining (or snowing), the weather change is when the rain (or the snow) stops, or the like. The weather change may also include information on an increased strength of rain (or snow) from a state when it is raining (or snowing) lightly, or information on a reduced strength of rain (or snow) or cessation of rain (or snow) from a state when it is raining (or snowing) heavily.

When determining that the weather change is forecast within the predetermined time (step S509: Yes), the message displaying module 142 performs a control to generate a pop-up image that includes information indicative of details of the weather change and a time until the expected (or predicted) occurrence of the weather change, and displays the pop-up image in such a manner as to be superimposed on the map image of the map display screen 620 (step S510).

The pop-up 621 in FIG. 7 indicates a pop-up image that is generated and displayed by the message displaying module 142. The pop-up 621 is displayed in accordance with the central position mark 622.

Figure 8A:
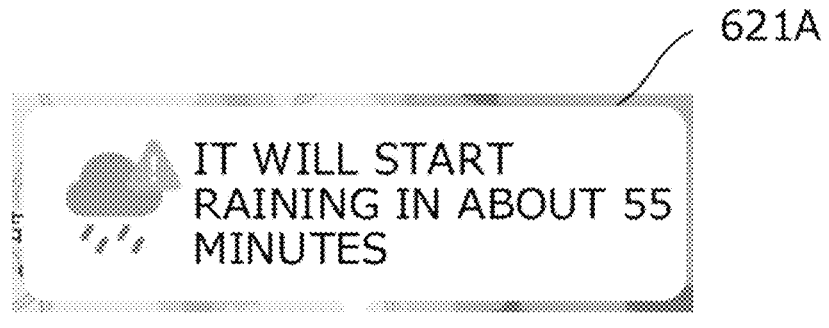
FIGS. 8A and 8B are diagrams illustrating examples of the display of pop-ups of weather changes on the mobile terminal according to the embodiment.
Figure 8B:
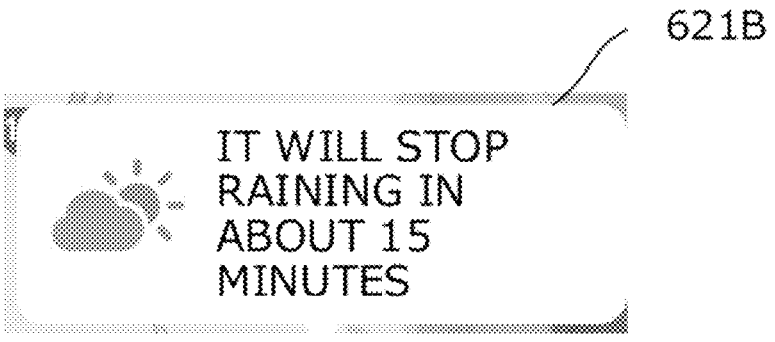

FIGS. 8A and 8B are diagrams illustrating display examples of the pop-up 621. FIG. 8A illustrates a pop-up 621a to be displayed when it is forecast that it will start raining in 55 minutes from a state when it is not presently raining. FIG. 8B illustrates a pop-up 621b to be displayed when it is forecast that rain will stop in 15 minutes from a state when it is presently raining.

In both of the pop-ups 621a and 621b, weather marks indicative of expected changes are displayed on the left side thereof, respectively. A rain weather mark is displayed in the pop-up 621a, and a cloudy-then-sunny weather mark is displayed in the pop-up 621b. In the pop-up 621a, a warning mark is displayed in such a manner as to be superimposed on the rain weather mark so as to prompt the user to pay attention to a forecast that it will start to rain.

In both of the pop-ups 621a and 621b, text representing details of expected changes is displayed. For example, in the pop-up 621a, a message stating "It is forecast to start raining in about 55 minutes" is displayed, and in the pop-up 621b, a message stating "It is forecast that the rain will stop in about 15 minutes" is displayed.

When determining that a weather change is not forecast within the predetermined time (step S509: No), the message displaying module 142 does not control the pop-up display in step S510. The operation detection unit 15 then detects whether the user operates the time change slider 625 (step S511).

Hereinafter, the time change slider 625 will be described.

Figure 9:
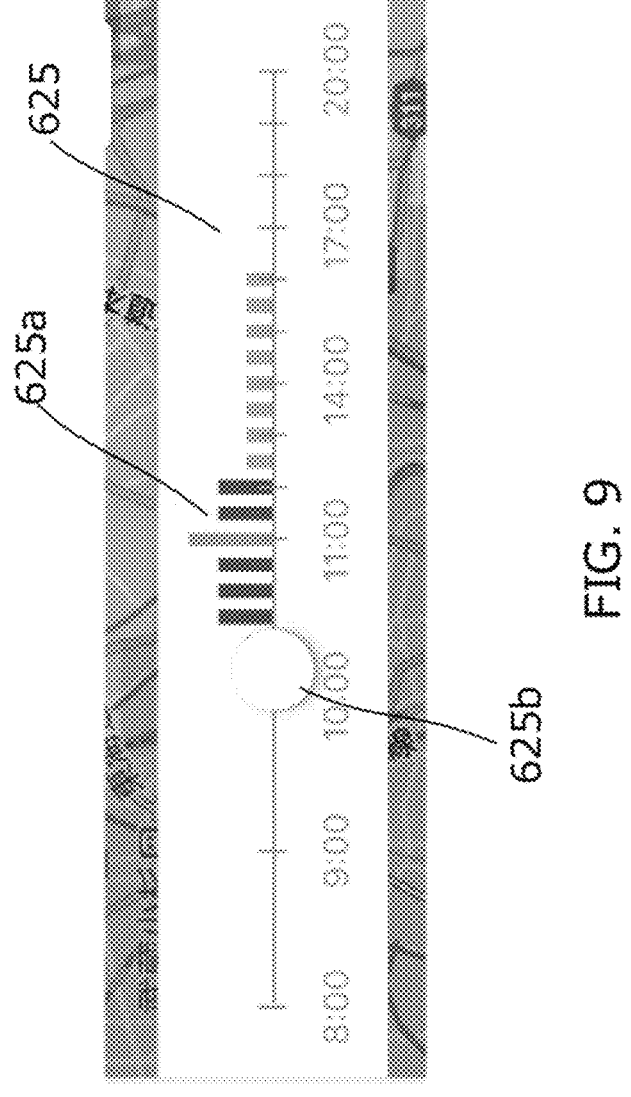
FIG. 9 is a diagram illustrating the display of a time change slider representing changes in weather over time on the mobile terminal according to the embodiment.

FIG. 9 is a diagram illustrating the time change slider 625 indicative of changes in weather over time and displayed on the map display screen 620 shown in FIG. 7.

In the time change slider 625, a bar graph 625a indicative of changes in weather over time, and a pointer 625b used for slide operations are displayed.

The bar graph 625a is a graph in which time is plotted on the abscissa and rainfall (or snowfall) intensity (which may also be the amount of rainfall or snowfall) is plotted on the ordinate. The stronger the rainfall (or snowfall) at each time plotted on the abscissa, the higher the bar that is displayed. In time slots when it does not rain (or snow), no bar is displayed.

The time scales from a past two hours to a future ten hours are displayed on the abscissa. In FIG. 9, the central position of the abscissa is the time after about one hour from the present, the left end of the abscissa is a time about two hours prior to the present, and the right end of the abscissa is a time about ten hours from the present. The scale per hour from the central position to the right end is narrower than the scale from the left end to the central position.

At each of time points from the present to the past, the rainfall (or snowfall) intensity expressed by the bar graph 625a represents a value based on a measured value of the amount of rainfall (or snowfall) in the weather information, and at each of future time points, the rainfall (or snowfall) intensity represents a value based on a forecast value of an amount of rainfall (or snowfall) in the weather information.

The pointer 625b of the time change slider 625 is displayed at the current time position of the abscissa in the initial state in which the map display screen 620 of FIG. 7 is displayed. At this time, an image representing the weather at the current time is displayed as the weather image of the map display screen 62.

When the user touches the pointer 625b and performs a slide operation in the left-right direction, the operation detection unit 15 detects these operations and performs a control to move and display the pointer 625b at a position corresponding to the direction and distance of the slide operation. In other words, the display position of the pointer 625b is moved by the user performing the slide operation of the pointer 625b.

When the display position of the pointer 625b is moved, the map display module 141 displays an image representative of the weather at the time indicated by the position on the abscissa of the moved pointer 625b. In other words, a weather image at any time along the timeline of the time change slider 625 can be displayed as a result of the user performing the operation to move the pointer 625b.

Returning to FIG. 5, when the operation detection unit 15 detects that the user has performed the operation on the time change slider 625 to slide the pointer 625b (step S511: Yes), the procedure returns to step S507. At step S507, the weather information acquisition unit 13 again acquires weather information at the time indicated by the moved pointer 625b.. Then, at step S508, the map display module 141 performs a control to generate a weather image based on the acquired weather information, and again displays the weather image in such a manner as to be superimposed on the map image.

When no operation to the time change slider 625 is detected (step S511: No), the operation detection unit 15 then detects whether the user has performed an operation to slide a displayed part of the map image (step S512). As described with reference to FIG. 7, the display of the map image can be moved and the display position of the current position mark 623 can be moved by the user touching any position of the map image and performing a slide operation.

When the operation detection unit 15 detects that the user has performed an operation to slide the displayed part of the map image (step S512: Yes), the procedure returns to step S506, in which the map acquisition unit 12 again acquires map information to generate a map image for display in accordance with the direction and distance of the slide operation detected by the operation detection unit 15. Further, at step S507, the weather information acquisition unit 13 again acquires weather information to generate a weather image for display in accordance with the direction and distance of the slide operation detected by the operation detection unit 15.

At step S508, the map display module 141 again performs control to generate a map image based on the acquired map information, further generate a weather image based on the acquired weather information, and again display the weather image in such a manner as to be superimposed on the map image.

When the operation detection unit 15 does not detect that the user has performed an operation to slide the displayed part of the map image (step S512: No), the procedure returns to step S509 to continue the processing.

It is of note that the pop-up 621 displayed by the message displaying module 142 continues to be displayed unless the map display screen 620 is switched to another screen or an operation to slide the display position of the map or the like is performed. Even when an operation to slide the pointer 625b of the time change slider 625 is performed to update the display of the weather image, the pop-up 621 continues to be displayed. The message displaying module 142 updates the time display in the displayed pop-up 621 with passage of time. Further, when there is a change in the forecast, the display may be changed or caused to disappear.

As for the acquisition of weather information by the weather information acquisition unit 13 when displaying the map display screen 620, weather information in time slots within a timeline range (a range of a past two hours and a future ten hours in the above-described example) displayed in the time change slider 625 may be acquired. By acquiring weather information in these time slots, the map display module 141 is able to display a weather image without again acquiring weather information even when the pointer 625b of the time change slider 625 is operated.

Although data received from the distribution server 3 as the weather information in these time slots may be stored in the memory 102 of the mobile terminal 1, the data may also be stored in the memory 302 of the distribution server 3 in such a manner that only weather information at the current time is stored in the memory 102 of the mobile terminal 1. In this case, if weather information in any other time slot is required by operation to the pointer 625b of the time change slider 625 on the map display screen 620 of the mobile terminal 1 or the like, a request can be made at the distribution server 3 to receive therefrom weather information in the required time slot.

Further, although the distribution server 3 transmits weather information upon request from the mobile terminal 1, weather information previously received from the weather information server 5 is stored in the memory 302. Thus, when requested weather information is already stored in the memory 302, the distribution server 3 transmits the stored weather information to the mobile terminal 1. When the requested weather information is not stored or is missing, the distribution server 3 makes a request to the weather information server 5 for a part that is not stored or a part that is missing, transmits the received weather information to the mobile terminal 1, and stores the received weather information in the memory 302.

According to the embodiment described above, occurrence of a weather change at a position (the current position in the initial state of the display) on the map corresponding to the center of the screen, and a time until the occurrence of the weather change can be easily visualized with reference to the map display screen 620.

Further, according to the present embodiment, the central position mark 622 indicative of the center of the screen, and the current position mark 623 indicative of the current position, can be displayed on the same screen as that for the user's slide operation on the map display screen 620, as illustrated in FIG. 7. In other words, the user can perform an operation to cause movement of a desired position, such as a destination to which the user plans to move, to the center of the screen, and thereby display the current position and the desired position on the same screen. Then, the pop-up 621 is displayed such that the user can determine in advance a weather change at the destination, for example, to which the user is about to move, while also being able to readily understand the positional relationship between the current position and the desired position on the map.

Thus, the pop-up 621 is displayed on the map display screen 620 in such a manner as to be superimposed on the map image to provide a pop-up display of the time until the weather change occurs, thereby enabling simultaneous visual recognition by the user of the distance between the current position and a point at which the weather change occurs, and a time until the weather change occurs.

This configuration assists the user in making various decisions. For example, if the user is able to determine that it will start to rain at a destination in 15 minutes, the user may decide against reaching the destination on foot within 15 minutes based on the positional relationship between the destination and the current position on the map. In this case, the user can decide in advance whether to carry an umbrella, or take a train, a bus, a taxi, or the like.

Further, since the pop-up 621 is not displayed when no weather change is forecast, the pop-up 621 is not repetitively displayed, and thus provides clarity of information without undue distraction.

Further, when a weather change is forecast at a point corresponding to the center of the map as a result of the user performing an operation to slide the map, since the pop-up 621 is displayed, the user is able to observe a point at which there is a weather change simply by performing the slide operation.

For example, when the user selects a point as a destination in a state that the pop-up 621 is displayed forecasting that it will start to rain at a point corresponding to the central position of the map, the user can slide the map display to find a point at which no pop-up 621 is displayed.

[Modifications]

The embodiment described above can be modified in various ways. Examples of these modifications will be described below. It is of note that the above-described embodiment and the modifications described below may also be combined as appropriate.

(1) In the above-described embodiment, there is configuration such that the map display screen 620 is first displayed as a result of the user touching the top icon 602 displayed on the top screen 600, and the pop-up 621 is displayed in such a manner as to be superimposed on the display screen, thereby informing the user of a weather change forecast. However, the notification method is not limited thereto. For example, the forecast result of a weather change at the current position or at a point pre-registered by the user may be displayed in the top icon 602 displayed on the top screen 600. In this case, since the pop-up 621 is also displayed on the map display screen by touching the top icon 602, the user is able to determine at a glance a position at which the weather change is notified.

Further, the notification is not limited to the in-app notification, the configuration may also be such that the user is informed about the forecast of the weather change by a push notification on the mobile terminal 1. In this case, the user can also determine at a glance whether the weather change is forecast at the current position or at a predetermined point.

FIG. 10 is a diagram illustrating display examples of top icons to be displayed on the top screen according to a modification. FIG. 10A illustrates a top icon 602a to be displayed at a normal time (i.e., when no weather change is forecast). A term "Rain Radar" is displayed on the right side of the top icon 602a, and a mark representing the radar is displayed on the left side thereof.

Figure 10A:
FIGS. 10A to 10E are diagrams illustrating icons displayed on the top screen of an app on the mobile terminal according to a modification.
Figure 10B:

FIG. 10B illustrates a top icon 602b to be displayed when it is not presently raining but it is forecast that rainfall will start within a predetermined time. For example, text stating "Rain forecast in two hours" is displayed on the right side of the top icon 602b, and a weather mark representative of rain and a warning mark overlapping the weather mark are displayed on the left side thereof.

Figure 10C:

FIG. 10C illustrates a top icon 602c to be displayed when it is not presently snowing but it is forecast that snowfall will start within a predetermined time. For example, text stating "Snow forecast in two hours" is displayed on the right side of the top icon 602c, and a weather mark representative of snow and a warning mark overlapping the weather mark are displayed on the left side thereof.

Figure 10D:

FIG. 10D illustrates a top icon 602d to be displayed when it is presently raining and it is forecast that the rain will stop within a predetermined time. The term "Rain Radar" is displayed on the right side of the top icon 602d, and the weather mark representative of rain is displayed on the left side thereof. Since no warning mark is displayed, the user can recognize that it is presently raining but the rain will stop within the predetermined time.

Figure 10E:

FIG. 10E illustrates a top icon 602e to be displayed when it is presently snowing and it is forecast that the snow will stop within a predetermined time. The term "Rain Radar" is displayed on the right side of the top icon 602e, and the weather mark representative of snow is displayed on the left side thereof. Since no warning mark is displayed, the user can recognize that it is presently snowing but the snow will stop within the predetermined time.

In the above-described embodiment, to change the display of the top icon 602, as illustrated in FIG. 10 described above, not only present weather information at the current position but also future weather information (weather forecast information) need only be acquired at processing step S503 to acquire weather information of FIG. 5. By determining whether a weather change occurs at a current position within a predetermined time based on the future weather forecast information acquired by the weather information acquisition unit 13, the display control unit 14 is able to perform a control to change the top icon display as illustrated in FIG. 10.

The display of the top icon 602 described above enables the user to check if there is a weather change at the current position within the predetermined time simply by viewing the top icon 602 of the top screen 600.

(2) In the above-described embodiment, the display of the pop-up 621 is provided for a weather change at a position on the map displayed at the center of the screen. However the display may also be provided for a weather change at the current position of the mobile terminal 1. In this case, the pop-up 621 is displayed at a position corresponding to the current position mark 623 on the map display screen 620. Further, the pop-up 621 may be displayed at a position designated at will by the user on the map. In addition, the user is able to set for selection the central position of the map, the current position, and any other position as a target position at which the pop-up 621 is displayed.

Further, the display of the pop-up 621 may be provided at two or more positions. For example, the display of the pop-up 621 may be provided at both the central position of the screen and the current position (at both the central position mark 622 and the current position mark 623 in FIG. 7). In this case, when the user operates the screen display to bring a destination to the central position, the user can visually check the forecast of weather changes at both the current position and the destination on the same screen.

As described above, when the display of the pop-up 621 is provided at two or more positions, the display of the time change slider 625 may be allotted to give priority to a display corresponding to a position at which a weather change is forecast. Further, when weather changes are forecast at two or more positions, two or more time change sliders 625 corresponding to the respective positions may be displayed.

(3) In the above-described embodiment, processing for generating a forecast to display the pop-up 621 is performed by the message display module 142 of the mobile terminal 1, but the distribution server 3 may perform the processing and transmit, to the mobile terminal 1 details of the pop-up to be displayed.

(4) In the above-described embodiment, the display of the pop-up 621 is provided for a weather change, but a change in any other phenomenon may also be targeted. For example, a change in scattering of fine particles floating in air such as pollen or PM 2.5, cherry blossom forecast, autumn leaves forecast, rainy season forecast, or the like may also be displayed.

Further, in addition to changes in natural phenomena, events such as sports events, holding and ending of bargain sales, and the occurrence/elimination of traffic and/or pedestrian congestion may also be displayed.

Figure 11:
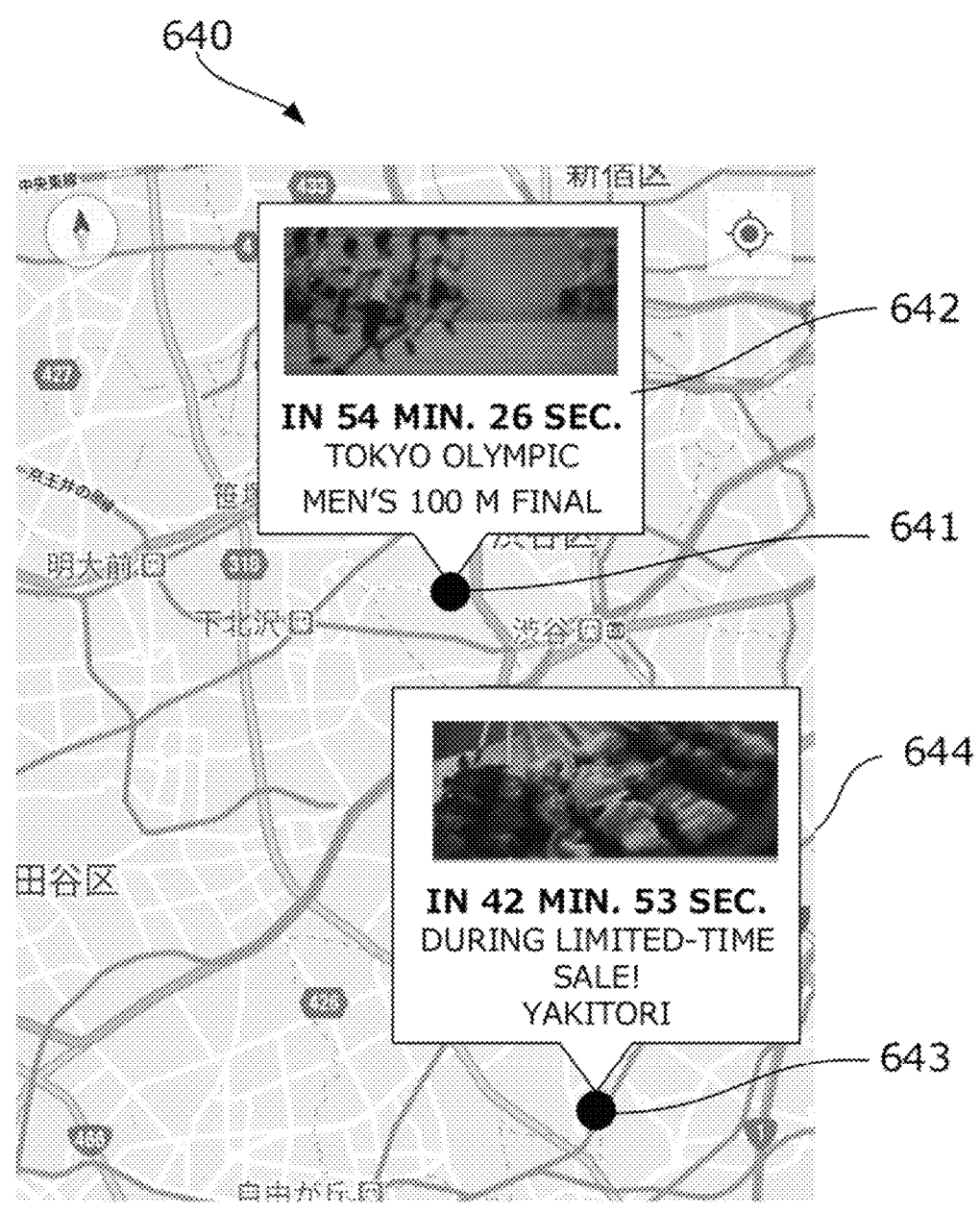
FIG. 11 is a diagram illustrating the display of pop-ups indicating the occurrence of events on the mobile terminal according to another modification.

FIG. 11 is a diagram illustrating an example of a pop-up displaying holding/ending of a sports event and a bargain sale on a map display screen. When an event and a bargain sale are held within a predetermined time at locations (a stadium and a store) on the displayed map, pop-ups, each including details of the event or the bargain sale to be held, a time until the event is held or the bargain sale will finish, and a related image, are displayed on a map display screen 640.

In FIG. 11, as a pop-up 642 it is displayed that a specific Olympic competition will start in 54 minutes 26 seconds at a stadium located at a point 641. The time display is updated to count down over time.

Further, as a pop-up 644 it is displayed that a bargain sale held at a restaurant located at a point 643 will finish in 42 minutes 53 seconds. The time display is updated to count down over time.

To display pop-ups as illustrated in FIG. 11, the mobile terminal 1 acquires information, such as events and bargain sales held near the current position, from a server connected to the network 2 and on which event information and the like are accumulated. This information is then analyzed in the display control unit 14 to perform control to generate and display the pop-ups as illustrated in FIG. 11.

It is of note that the display of a weather image on the map display screen 640 of FIG. 11 is not always necessary, although the weather image may also be displayed. Further, a pop-up representing a weather change forecast in the above-described embodiment may be displayed on the map display screen 640 shown in FIG. 11. By displaying this pop-up, the user can easily check the weather at a point at which an event or a bargain sale is held.

Further, a time change slider may be displayed on the map display screen 640 shown in FIG. 11. The time change slider may be such that a bar graph is displayed in a time slot when the event or the bargain sale is held. Further, the time change slider need only be displayed in correspondence to an event or a bargain sale for which a pop-up is displayed; and when no pop-up is displayed, the time change slider need not be displayed. When two or more pop-ups are displayed as illustrated in FIG. 11, two or more time change sliders corresponding to the respective pop-ups may be displayed.

Figure 12:
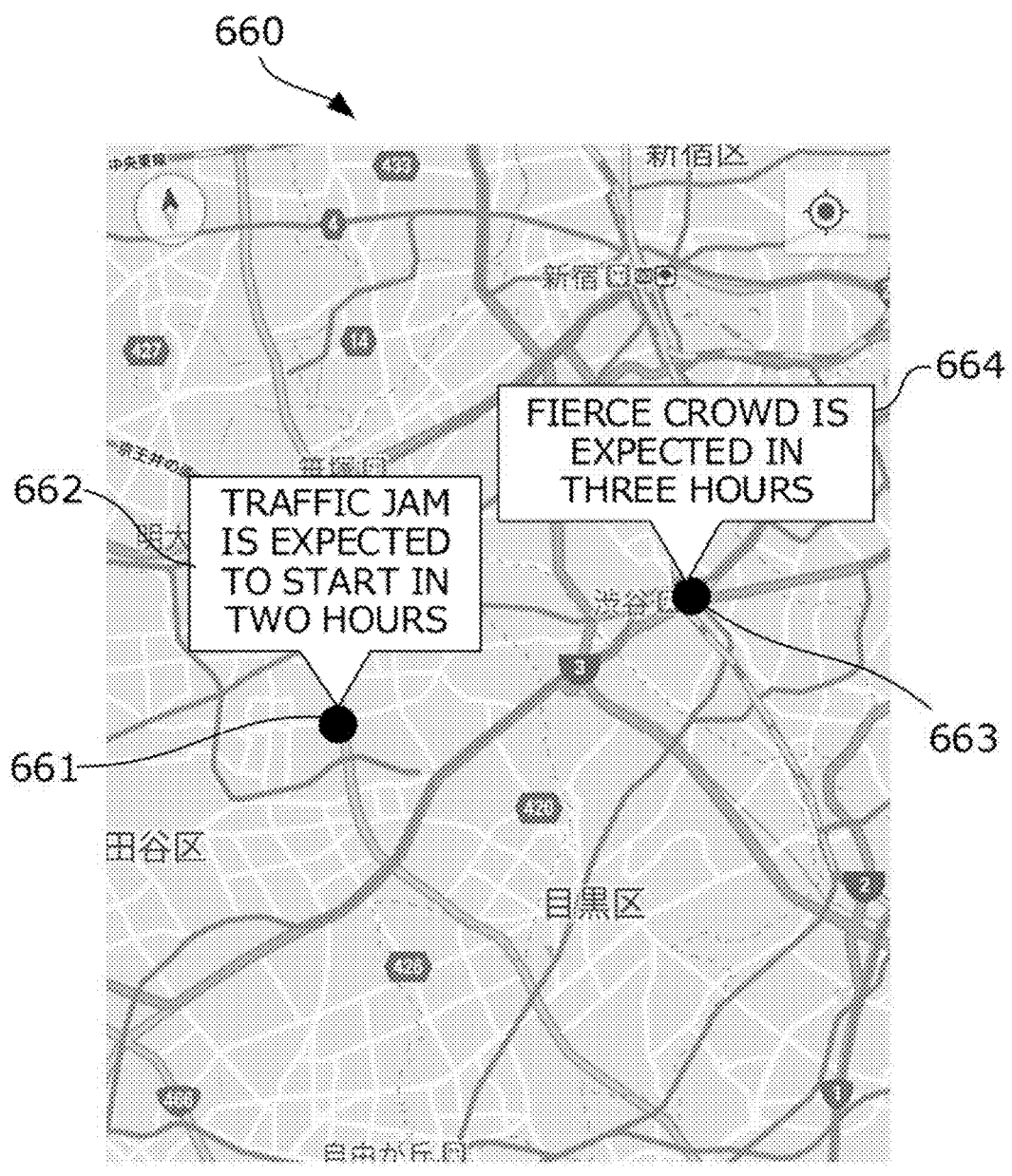
FIG. 12 is a diagram illustrating the display of pop-ups on the mobile terminal indicating predicted changes in vehicle and pedestrian congestion according to still another modification.

FIG. 12 is a diagram illustrating an example of a pop-up displaying on a map display screen predicted vehicle and pedestrian congestion. When vehicle or pedestrian congestion occurs or dissipates within a predetermined time at a location (on a road or the like) on a map displayed on a map display screen 660, a pop-up including the details that occur or dissipate and the time until the occurrence or dissipation is displayed.

In FIG. 12, there is displayed as a pop-up 662 that vehicle congestion will start in two hours on a road located at a point 661 displayed on the map display screen 660. Further, there is displayed as a pop-up 664 that pedestrian congestion will occur in three hours at a point 663.

In order to display pop-ups as illustrated in FIG. 12, the mobile terminal 1 acquires information on vehicle/pedestrian congestion that occurs/dissipates near the current position from a server connected to the network 2 and on which vehicle/pedestrian congestion information is accumulated. Then, these pieces of information are analyzed in the display control unit 14 to perform control to generate and display the pop-ups as illustrated in FIG. 12.

It is of note that the display of a weather image on the map display screen 660 of FIG. 12 is not always necessary, but the weather image may also be displayed. Further, a pop-up representing a weather change forecast in the above-described embodiment may be displayed on the map display screen 660 of FIG. 12. By displaying this pop-up, the user can easily check the weather at a point at which vehicle or pedestrian congestion will occur or dissipate.

Further, a time change slider may be displayed on the map display screen 660 of FIG. 12. The time change slider may be such that a bar graph is displayed in a time slot when vehicle or pedestrian congestion is predicted to occur. Further, the time change slider has only to be displayed corresponding to the position at which the pop-up is displayed, and when no pop-up is displayed, the time change slider may not be displayed. When two or more pop-ups are displayed as illustrated in FIG. 12, two or more time change sliders corresponding to the respective pop-ups may be displayed.

(5) In the above-described embodiment, the message display module 142 provides the display of the pop-up 621 in a state where the map display screen 620 is displayed, but the timing of display the pop-up 621 is not limited to this case.

The pop-up 621 may also be displayed in a state where any screen other than the map display screen 620 of the app is displayed. Further, in the running state of the app, the pop-up 621 may be displayed upon switching to the screen of any other app or the screen of the system.

In these cases, the details of a weather change at the current position of the mobile terminal 1 and the time until the weather change occurs have only to be displayed in the pop-up 621. In addition to the current position, the pop-up 621 may also be displayed in a case where the change is expected to occur within a certain preset range from the current position (for example, within a 1 km radius from the current position, or the like).

Figure 13:
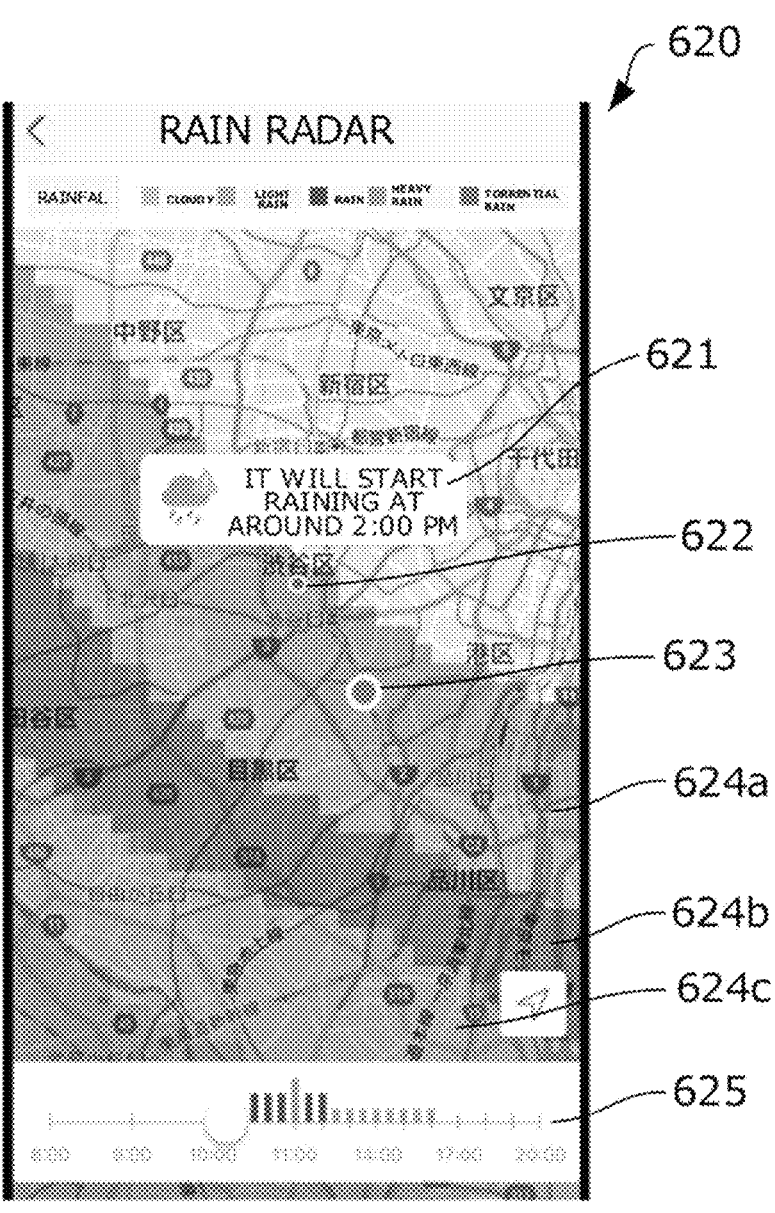
FIG. 13 is a diagram illustrating a display screen of weather conditions on the mobile terminal according to a modified embodiment.

(6) In the above-described embodiment, a displayed message indicates a length of time until an expected occurrence of an event. However, the massage may include a time at which the event is expected to occur as shown in FIG. 13. Alternatively, the message may indicate a length of time from the current time until the expected occurrence of the event. For example, the message may indicate a time duration that is a length of time from the current time to a time at which an event is expected to occur (e.g. "Rain continues for 6 hours."). In other words, the message may indicate a duration of a current state (e.g. raining) until a next event occurs (e.g. stop raining).

The processor 101 may determine whether the message includes the time at which the event is expected occur or the length of time from a time based on a time difference between the current time and the time at which the event is expected occur. For example, the message may indicate the length of time as shown in FIG. 7 when the time difference is less than a threshold length of time (an hour, for example) and a time at which the event is expected to occur when the time difference is more than a threshold length of time as shown in FIG. 13. The threshold length of time may be determined by a user regardless of the event. Alternatively, a threshold length of time may be determined based on attributes or context of an event. For example, when the event relates to weather information, a length of time until an expected occurrence of the event is displayed and when the event relates to a sports, a time at which the event is expected to occur is displayed.

In a preferred embodiment, when a length of time until the occurrence of an event is less than the threshold length of time (10 minutes, for example), the message may indicate that the event will occur soon without using a quantitative expression. When the mobile terminal 1 receives information that is insufficient for determining a predicted time at which an event will occur, the processor 101 may generate and display a message indicative of a minimum duration of a current state. For example, if weather information provided is limited to two hours from a current time, and no change of weather (e.g. stop of rain) from a current state (e.g. rain) is predicted within two hours, a displayed message may be "It will continue raining for at least 2 hours".

Simply stated, an information processing apparatus according to the present technology may include a processor configured to, when an event is expected to occur at a location of interest, notify a user of information on a time relating to the event. The information may include at least one of: a time at which the event is expected to occur; a length of time until the expected occurrence of the event; and a duration of a current state. The term "a time at which the event is expected to occur" means not only an exact time (e.g. 9 o'clock) but also an approximate time (e.g. around 9). The term "a length of time until the expected occurrence of the event" not only means a quantitative expression (e.g. "It will start raining in 10 minutes.") but also a qualitative expression (e.g. "It will start raining soon."). The term "a duration of a current state" not only means a specific duration (e.g. "Rain continues for 3 hours."), but also a minimum duration (e.g. "Rain continues for at least two hours.").

What is claimed is:

1. An information processing apparatus comprising a processor configured to:
   set an initial location of interest to a current position of a user and display a map on a screen, the map displaying the initial location of interest at a central position;
   when a predetermined event is expected to occur at a location of interest, display the map including the location of interest and information indicative of an expected occurrence of the predetermined event on the screen; and
   responsive to a user operation on the map via the screen, display a moved map such that the initial location of interest and the location of interest are included.

2. The information processing apparatus according to claim 1, wherein the information includes a length of time until the expected occurrence of the predetermined event.

3. The information processing apparatus according to claim 1, wherein the information further includes a magnitude of the predetermined event.

4. The information processing apparatus according to claim 1, wherein the predetermined event relates to a weather change and the information includes a graph of an expected change of weather conditions on a time scale basis.

5. The information processing apparatus according to claim 1, wherein the moved map displays the location of interest at the central position and displays the initial location of interest at a new position based on the user operation while maintaining a positional relationship between the initial location of interest and the location of interest.

6. The information processing apparatus according to claim 1, wherein the processor displays an image representative of a change of the predetermined event at the location of interest while displaying the map.

7. The information processing apparatus according to claim 1, wherein the processor acquires the information on the predetermined event in an area including the location of interest and generates a message by predicting a date and time of occurrence of the predetermined event based on the acquired information.

8. The information processing apparatus according to claim 1, wherein the predetermined event is at least one of a sports event, a bargain sale, and vehicle and/or pedestrian congestion.

9. A non-transitory computer-readable storage medium having instructions embodied thereon, the instructions, when executed by a computer, causing the computer to:
   set an initial location of interest to a current position of a user and display a map on a screen, the map displaying the initial location of interest at a central position;
   when a predetermined event is expected to occur at a location of interest, display the map including the location of interest and information indicative of an expected occurrence of the predetermined event on the screen; and
   responsive to a user operation on the map via the screen, display a moved map such that the initial location of interest and the location of interest are included.

10. A method for displaying event information, the method being executed by at least one processor, the method comprising:
   setting an initial location of interest to a current position of a user and display a map on a screen, the map displaying the initial location of interest at a central position;
   when a predetermined event is expected to occur at a location of interest, displaying the map, the map including the location of interest and information indicative of an expected occurrence of the predetermined event on the screen; and
   responsive to a user operation on the map via the screen, displaying a moved map such that the initial location of interest and the location of interest are included.

\* \* \* \* \*